US009371049B2

(12) United States Patent
Baviskar et al.

(10) Patent No.: US 9,371,049 B2
(45) Date of Patent: Jun. 21, 2016

(54) FRONT LOAD DISTRIBUTION MECHANISM FOR A VEHICLE

(71) Applicant: GM GLOBAL TECHNOLOGY OPERATIONS LLC, Detroit, MI (US)

(72) Inventors: Tushar S. Baviskar, Bangalore (IN); Vijay Shankar Iyer, Bangalore (IN); Sudhir K. Maddireddy, Lake Orion, MI (US); Scott A. Sytsma, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 14/029,160

(22) Filed: Sep. 17, 2013

(65) Prior Publication Data

US 2015/0076863 A1 Mar. 19, 2015

(51) Int. Cl.
*B60R 19/14* (2006.01)
*B60R 19/26* (2006.01)
*B60R 19/18* (2006.01)
*B60R 19/12* (2006.01)

(52) U.S. Cl.
CPC .............. *B60R 19/26* (2013.01); *B60R 19/12* (2013.01); *B60R 19/18* (2013.01); *B60R 2019/186* (2013.01); *B60R 2019/1886* (2013.01)

(58) Field of Classification Search
CPC ....... B60R 19/14; B60R 19/023; B62D 25/08

USPC .............. 296/187.09, 193.1; 293/32, 44, 115, 293/131, 145, 148
See application file for complete search history.

(56) References Cited

U.S. PATENT DOCUMENTS

| 2,578,068 | A | * | 12/1951 | Johnson ........................ 293/132 |
| 4,406,489 | A | * | 9/1983 | Trabert ......................... 293/115 |
| 4,753,468 | A | * | 6/1988 | Szymczak et al. ............ 293/132 |
| 4,944,540 | A | * | 7/1990 | Mansoor et al. .............. 293/115 |
| 5,810,427 | A | * | 9/1998 | Hartmann et al. ....... 296/187.03 |
| 8,251,438 | B2 | * | 8/2012 | Linden et al. ............ 296/187.09 |

* cited by examiner

*Primary Examiner* — Jason S Morrow
*Assistant Examiner* — E Turner Hicks
(74) *Attorney, Agent, or Firm* — Quinn Law Group, PLLC

(57) ABSTRACT

A vehicle includes a body that extends along a longitudinal axis. The body includes a front fascia and a forward load bearing beam that are disposed transverse to the longitudinal axis. A load distribution mechanism is rotatably attached to the forward load bearing beam for rotation about a rotation axis. The load distribution mechanism includes a first portion and a second portion. The first portion is for engaging an upper portion of the front fascia, above the forward load bearing beam. The second portion is for engaging a lower portion of the front fascia, below the forward load bearing beam. The front fascia engages the first portion and the second portion of the load distribution mechanism, and the load distribution mechanism rotates about the rotation axis, to control displacement of the front fascia in response to an applied force in which an object contacts the front fascia.

17 Claims, 4 Drawing Sheets

FRONT LOAD DISTRIBUTION MECHANISM FOR A VEHICLE

TECHNICAL FIELD

The invention relates to a load distribution mechanism for controlling displacement of a front fascia of a vehicle in response to an externally applied force.

BACKGROUND

Vehicle bodies include a front fascia disposed at the forward end of the vehicle. A forward load bearing beam is disposed rearward of the front fascia. Different strategies and/or features may be used to control the stiffness and/or displacement of the front fascia in response to an externally applied force. Different strategies and/or features may be used for each of an upper portion of the front fascia, disposed above the forward load bearing beam, and a lower portion of the front fascia, disposed below the forward load bearing beam. For example, a lower bumper stiffener may be included to increase the stiffness of a lower portion of the front fascia. Similar localized stiffening features may be adopted to control the stiffness of the upper portion of the front fascia.

SUMMARY

A vehicle is provided. The vehicle includes a body that extends along a longitudinal axis. The body includes a front fascia that is disposed transverse to the longitudinal axis. A forward load bearing beam is disposed transverse to the longitudinal axis, and is axially spaced rearward of the front fascia along the longitudinal axis. A load distribution mechanism is rotatably attached to the forward load bearing beam for rotation about a rotation axis. The load distribution mechanism includes a first portion and a second portion. The first portion is for engaging an upper portion of the front fascia, above the forward load bearing beam. The second portion is for engaging a lower portion of the front fascia, below the forward load bearing beam. The front fascia engages the first portion and the second portion of the load distribution mechanism, and the load distribution mechanism rotates about the rotation axis, to control displacement of the front fascia in response to an externally applied force in which an object contacts the front fascia.

Accordingly, the load distribution mechanism controls the displacement of both the upper portion and the lower portion of the front fascia simultaneously. The load distribution mechanism is a rotating device that is attached to the support structure of the vehicle, such as the frame rails or the front forward load bearing beam, which can be sized, shaped, configured, and/or tuned to satisfy the specific design and packaging restraints of different vehicles.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Referring to the Figures, wherein like numerals indicate like parts throughout the several views, a vehicle is generally shown at 20. The vehicle may include any style and/or configuration, such as but not limited to a sedan, mini-van, SUV, etc.

Figure 1:
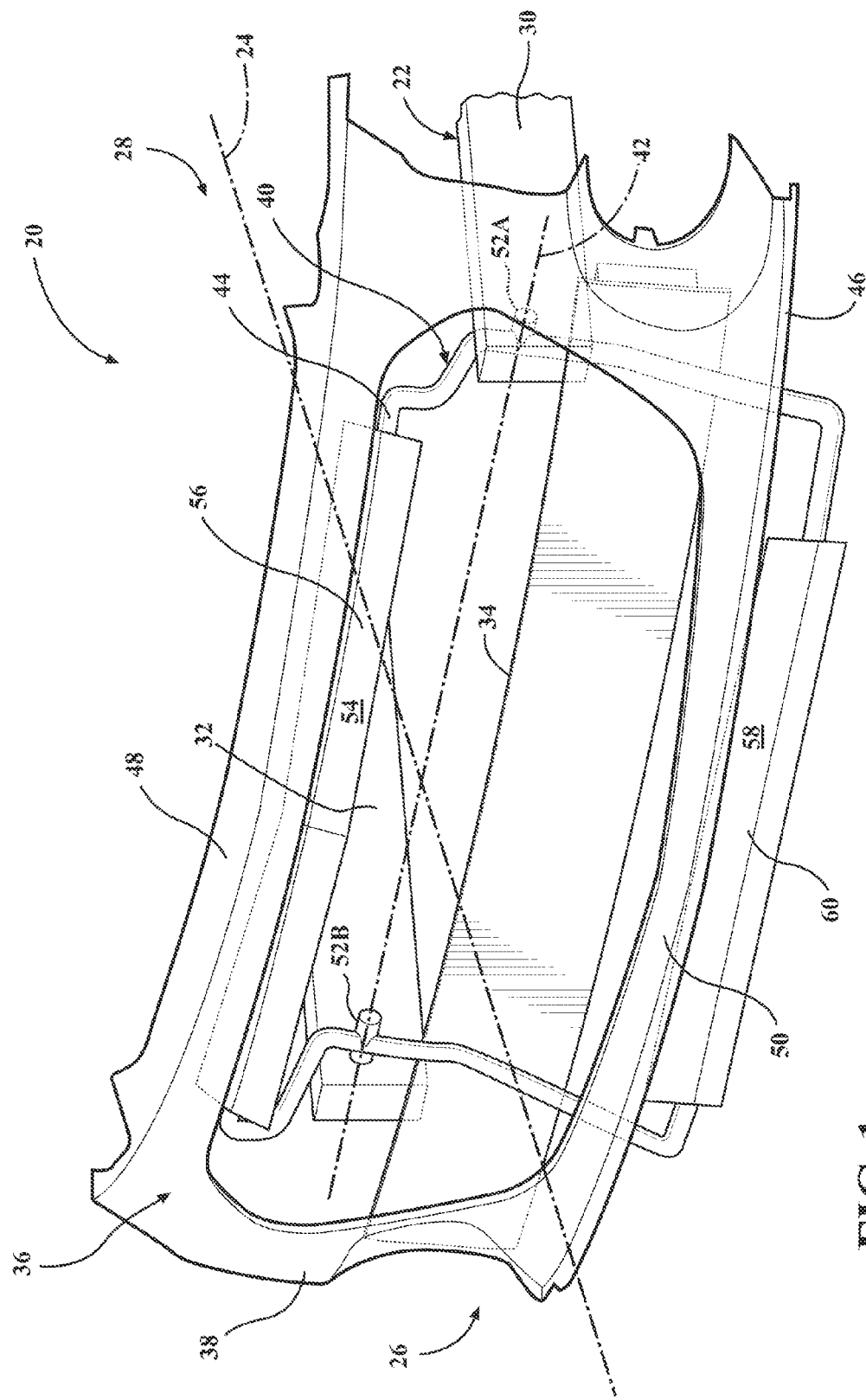
FIG. 1 is a schematic perspective view of a vehicle showing a load distribution mechanism.
Figure 2:
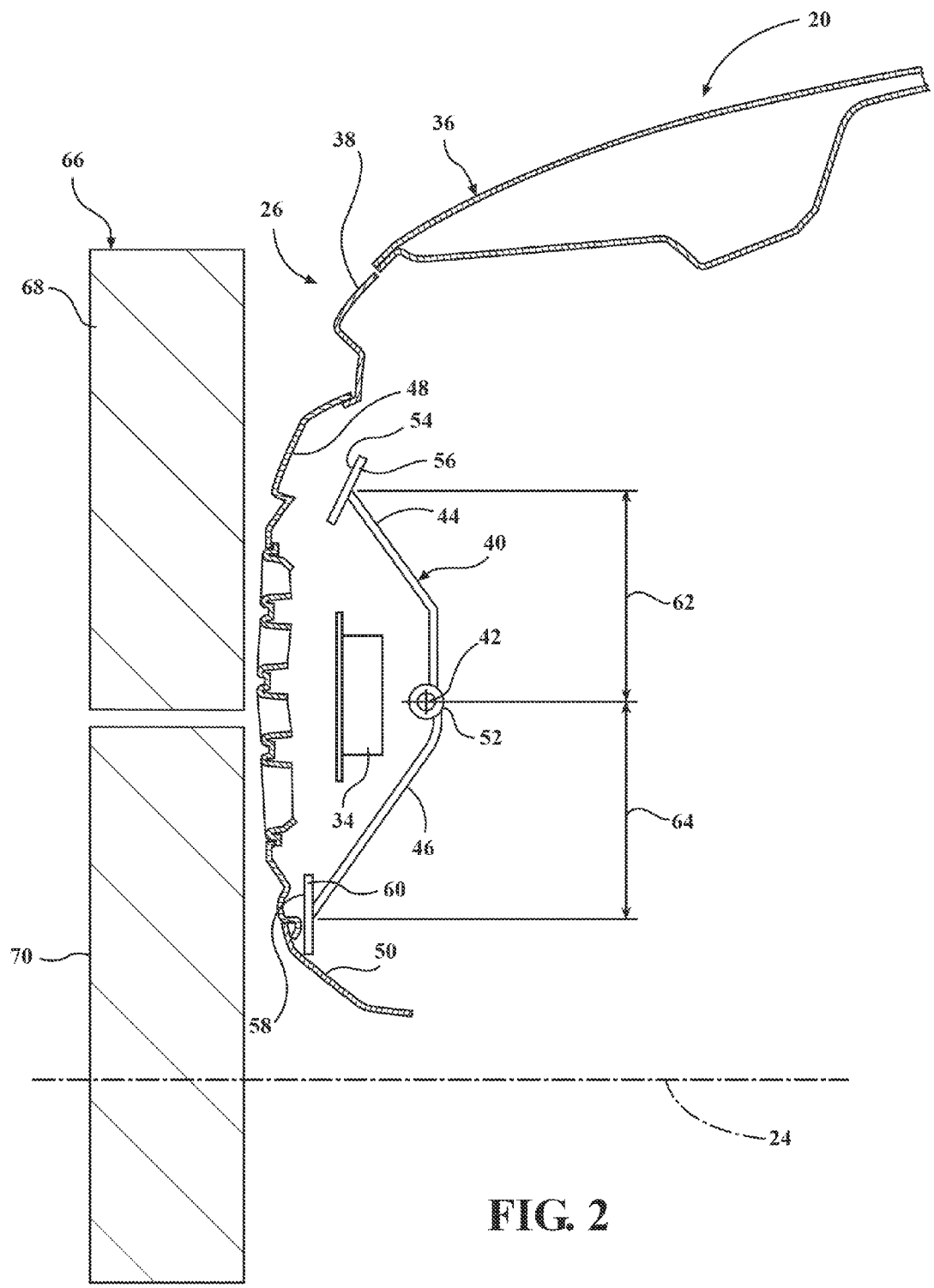
FIG. 2 is a schematic cross sectional view of the vehicle along a longitudinal axis prior to an externally applied force.

Referring to FIGS. 1 and 2, the vehicle 20 includes a support structure 22. The support structure 22 extends along a longitudinal axis 24 between a forward end 26 of the vehicle 20 and a rearward end 28 of the vehicle 20. The rearward end 28 is spaced from the forward end 26 along the longitudinal axis 24. The longitudinal axis 24 extends along a longitudinal center line of the vehicle 20. The support structure 22 supports the various components of the vehicle 20, such as but not limited to, the drivetrain, wheels, axles, body panels, etc. The support structure 22 may include, but is not limited to, a body on frame structure, or a unibody structure. The support structure 22 may include a first frame rail 30 and a second frame rail 32. The second frame rail 32 is laterally offset from the first frame rail 30 on opposing lateral sides of the longitudinal axis 24. If the primary support structure 22 is configured as a unibody 36 construction, then the first frame rail 30 and the second frame rail 32 may be described as a first motor rail and a second motor rail respectively. The support structure 22 may include an attached forward load bearing beam 34 that extends transverse to the longitudinal axis 24. For example, the forward load bearing beam 34 may be attached to each of the first frame rail 30 and the second frame rail 32 at forward ends thereof.

A body 36 is attached to and supported by the support structure 22. The body 36 includes a front fascia 38 that is disposed transverse to the longitudinal axis 24, and is disposed adjacent to the forward end 26 of the vehicle 20 and/or the support structure 22. The forward load bearing beam 34 is disposed generally parallel with the front fascia 38, and is axially spaced rearward of the front fascia 38 along the longitudinal axis 24.

A load distribution mechanism 40 is rotatably attached to the support structure 22. The load distribution mechanism 40 is rotatable about a rotation axis 42. The rotation axis 42 is perpendicular to the longitudinal axis 24. The rotation axis 42 is disposed axially rearward of the forward load bearing beam 34 along the longitudinal axis 24, with the front fascia 38 disposed opposite the forward load bearing beam 34 relative to the rotation axis 42. Accordingly, the forward load bearing beam 34 is disposed between the front fascia 38 and the rotation axis 42.

Preferably the load distribution mechanism 40 is attached to the forward load bearing beam 34. However, it should be appreciated that the load distribution mechanism 40 may alternatively be attached to some other portion of the support structure 22, such as the first frame rail 30 and the second frame rail 32. The load distribution mechanism 40 includes a first portion 44 and a second portion 46. The first portion 44 of the load distribution mechanism 40 operable to engage an upper portion 48 of the front fascia 38, which is generally disposed vertically above the forward load bearing beam 34. The second portion 46 of the load distribution mechanism 40 is operable to engage a lower portion 50 of the front fascia 38, which is generally disposed vertically below the forward load bearing beam 34.

The load distribution mechanism 40 includes a hinge 52, which interconnects the load distribution mechanism 40 and the support structure 22. For example, the hinge 52 may connect the load distribution mechanism 40 with the forward load bearing beam 34. Alternatively, the hinge 52 may connect the load distribution mechanism 40 with some other portion of the support structure 22, such as the first frame rail 30 and the second frame rail 32. The hinge 52 defines the rotation axis 42, about which the first portion 44 and the second portion 46 of the load distribution mechanism 40 rotate about.

As shown in FIG. 1, the hinge 52 includes a first hinge 52A and a second hinge 52B disposed on opposite sides of the longitudinal axis 24. The first hinge 52A and the second hinge 52B may each be attached to the forward load bearing beam 34, or may alternatively be attached to the first frame rail 30 and the second frame rail 32 respectively. As used within the written description describing the load distribution mechanism 40, reference to the hinge 52 includes both the first hinge 52A and the second hinge 52B.

As shown in FIG. 1, the lower portion 50 of the load distribution mechanism 40 includes a generally U-shaped configuration, and the upper portion 48 of the load distribution mechanism 40 includes a generally inverted U-shaped configuration. When viewed together, the upper portion 48 and the lower portion 50 of the load distribution mechanism 40 define a generally hollow, rectangular configuration when viewed from the forward end 26 of the support structure 22.

Referring to FIG. 2, the first portion 44 of the load distribution mechanism 40 extends from the rotation axis 42, vertically upward and axially forward along the longitudinal axis 24, to an upper contact surface 54. The first portion 44 may include a first plate 56 disposed at the upper vertical edge of the first portion 44 to define the upper contact surface 54. The second portion 46 of the load distribution mechanism 40 extends from the rotation axis 42, vertically downward and axially forward along the longitudinal axis 24, to a lower contact surface 58. The second portion 46 may include a second plate 60 disposed at the lower vertical edge of the second portion 46 to define the lower contact surface 58.

The upper contact surface 54 is vertically spaced from the rotation axis 42 a first distance 62, and the lower contact surface 58 is vertically spaced from the rotation axis 42 a second distance 64. The first distance 62 may be equal to the second distance 64. Alternatively, the first distance 62 may not be equal to the second distance 64. The first distance 62 and the second distance 64 may be varied to control the energy management and/or longitudinal displacement of the front fascia 38 in response to an externally applied force.

Figure 3:
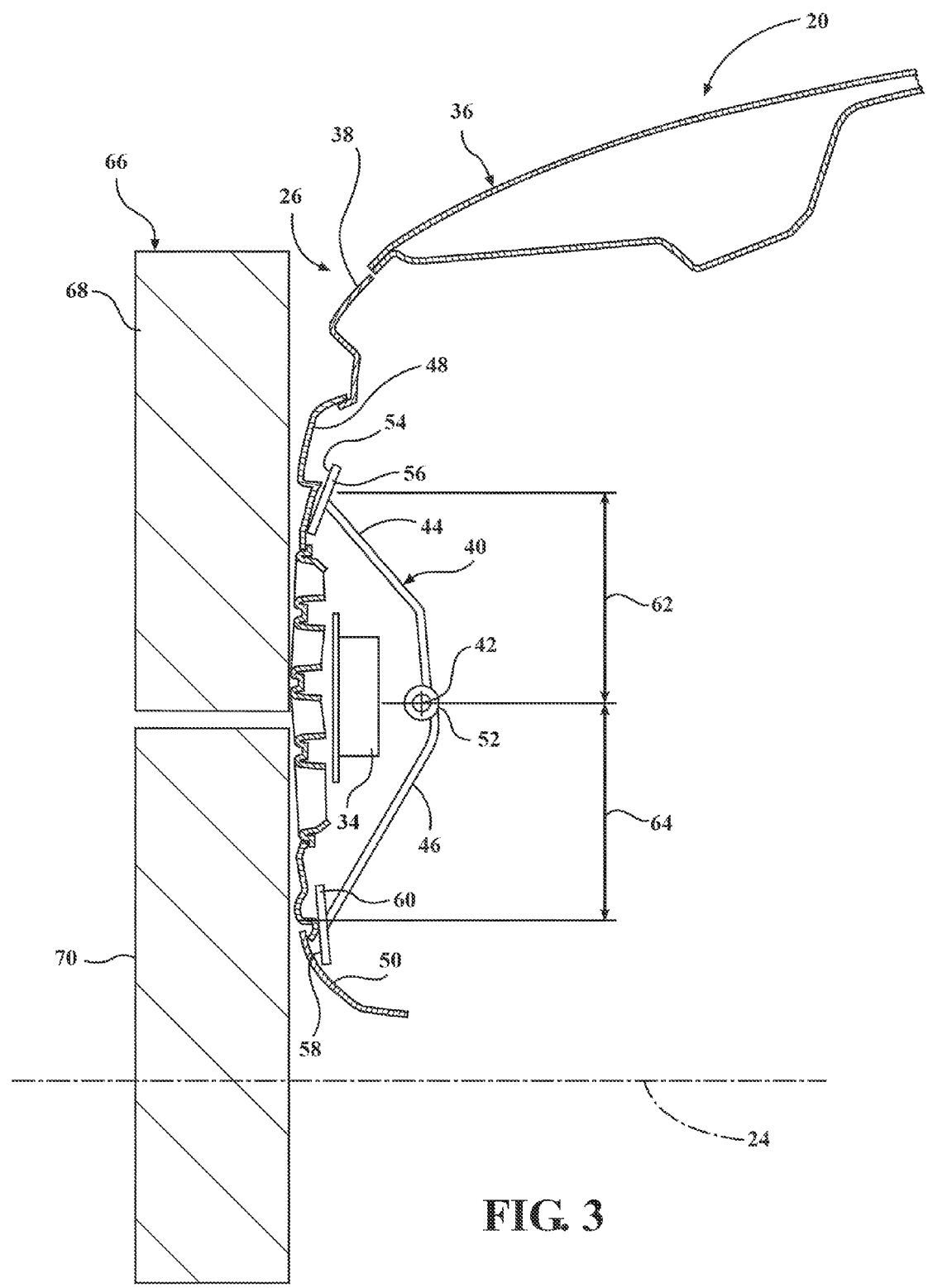
FIG. 3 is a schematic cross sectional view of the vehicle along the longitudinal axis during an externally applied force.

Referring to FIG. 3, during the application of an externally applied force event, in which an object 66 contacts the front fascia 38 from the forward end 26 of the vehicle 20, the front fascia 38 deforms longitudinally rearward, toward the forward load bearing beam 34 and the load distribution mechanism 40 respectively. The deformation of the front fascia 38, prior to contacting the forward load bearing beam 34 and/or the load distribution mechanism 40, absorbs some of the energy of the applied force. As the front fascia 38 deforms rearward, the front fascia 38 engages or contacts the first portion 44 and/or the second portion 46 of the load distribution mechanism 40. If the front fascia 38 only contacts one of the first portion 44 or the second portion 46 of the load distribution mechanism 40, then the load distribution mechanism 40 will rotate about the rotation axis 42 until the other of the first portion 44 and the second portion 46 of the load distribution mechanism 40 contacts the front fascia 38, at which time both the upper portion 48 and the lower portion 50 of the front fascia 38 are contacting the first portion 44 and the second portion 46 of the load distribution mechanism 40 simultaneously. The load distribution mechanism 40 may further rotate about the rotation axis 42, while both the first portion 44 and the second portion 46 are contacting and engaged with the upper portion 48 and the lower portion 50 of the front fascia 38 respectively, to control longitudinal displacement of the front fascia 38 along the longitudinal axis 24. The upper contact surface 54 and the lower contact surface 58 engage the upper portion 48 and the lower portion 50 of the front fascia 38 respectively, axially forward of the forward load bearing beam 34 along the longitudinal axis 24, in response to the externally applied force, in order to control the longitudinal displacement of the front fascia 38 prior to the front fascia 38 contacting the forward load bearing beam 34.

Depending upon the load distribution of the applied force, the load distribution mechanism 40 may rotate either clockwise or counterclockwise, as viewed on the page of FIGS. 2 and 3, to distribute the applied load, and minimize the possibility of bending an upper half 68 and a lower half 70 of the object 66 about the forward load bearing beam 34. For example, if the load from the applied force is primarily directed along a path disposed above the forward load bearing beam 34, the load distribution mechanism 40 may rotate clockwise to distribute the force to the lower portion 50 of the front fascia 38, thereby operating to maintain the general shape of the object 66, and limit bending of the object 66 about the forward load bearing beam 34. The magnitude of the force transferred from the first portion 44 to the second portion 46, and the displacement at the first plate 56 and the second plate 60, can be varied by changing the ratio of the first distance 62 and the second distance 64. The ratio of the first distance 62 and the second distance 64 is calculated to minimize the possibility of bending the upper half 68 and the lower half 70 of the object 66 about the front load bearing beam 34.

The first portion 44 and the second portion 46 of the load distribution mechanism 40 may be manufactured from any suitable material, such as but not limited to a metal, a plastic, or a combination of metals and plastics. The first portion 44 and the second portion 46 of the load distribution mechanism 40 may be designed to be flexible and/or deformable in a rearward direction along the longitudinal axis 24, to absorb energy in response to the applied force. As such, in addition to rotating about the rotation axis 42 to control the load distribution of the applied force on the front fascia 38, the first portion 44 and the second portion 46 of the load distribution mechanism 40 may bend and/or flex rearward to absorb additional energy, prior to the front fascia 38 contacting the forward load bearing beam 34.

Figure 4:
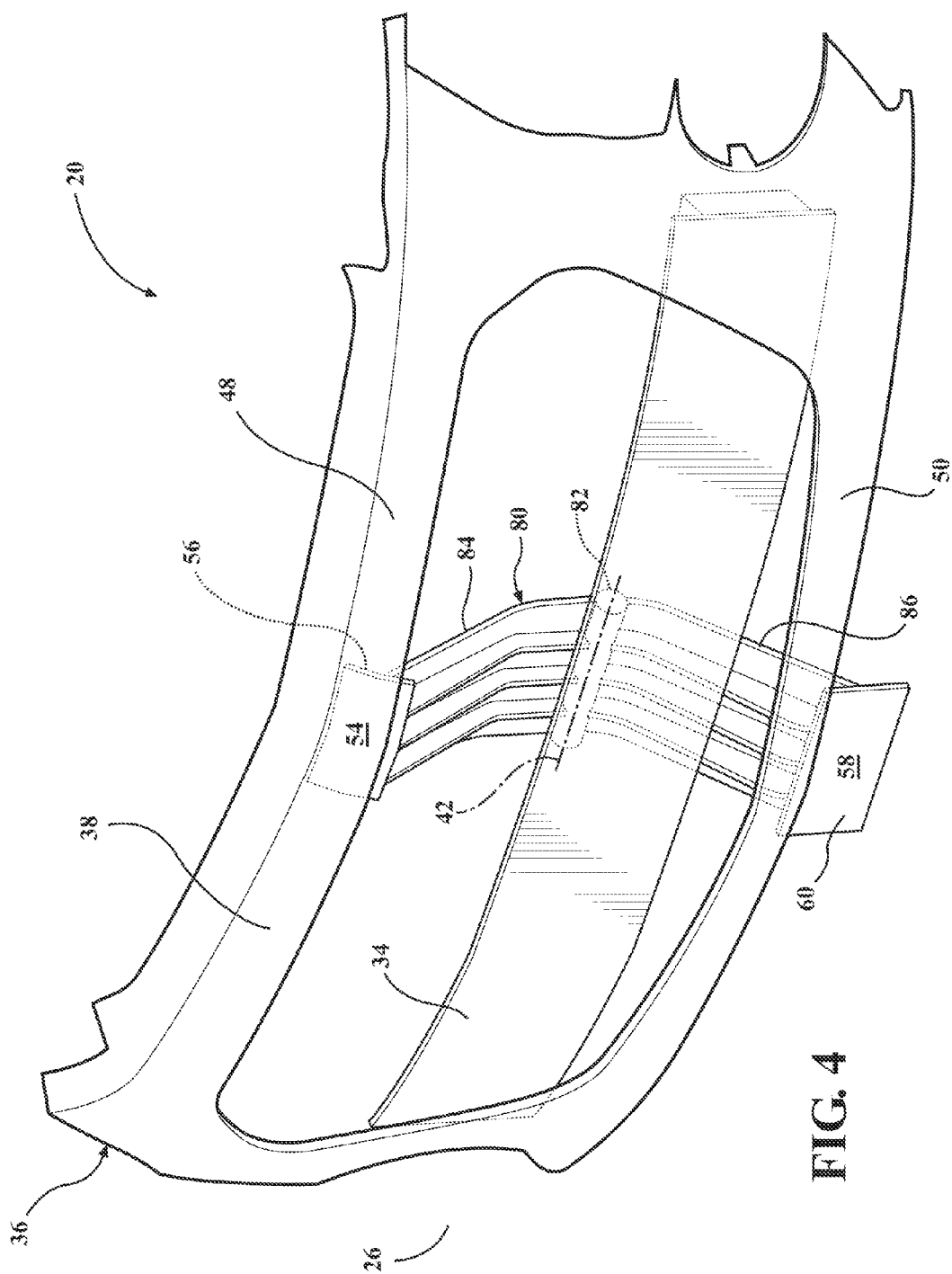
FIG. 4 is a schematic cross sectional view of the vehicle showing an alternative embodiment of the load distribution mechanism.

Referring to FIG. 4, an alternative embodiment of the load distribution mechanism is generally shown at 80. The load distribution mechanism 40 includes a single hinge 82 attached to the forward load bearing beam 34, and disposed generally lateral center of the forward load bearing beam 34. The load distribution mechanism includes a first portion 84 and a second portion 86. The first portion 84 and the second portion 86 each include a generally solid plate structure that extends outward from the hinge 82. The load distribution mechanism 80 only spans a portion of the lateral width of the front fascia 38. However, the load distribution mechanism 80 operates in the same manner as the load distribution mechanism 40 described above, to control the longitudinal displacement of the front fascia in response to an externally applied force.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a body extending along a longitudinal axis, and including a front fascia disposed transverse to the longitudinal axis;
   a forward load bearing beam disposed transverse to the longitudinal axis, and axially spaced rearward of the front fascia along the longitudinal axis; and
   a load distribution mechanism rotatably attached to the forward load bearing beam for rotation about a rotation axis, and including a first portion for engaging an upper portion of the front fascia above the forward load bearing beam, and a second portion for engaging a lower portion of the front fascia below the forward load bearing beam;
   wherein the front fascia engages the first portion and the second portion of the load distribution mechanism, and the load distribution mechanism rotates about the rotation axis to control displacement of the front fascia, in response to an externally applied force in which an object contacts the front fascia;
   wherein the first portion of the load distribution mechanism extends from the rotation axis vertically upward and axially forward along the longitudinal axis to an upper contact surface; and
   wherein the second portion of the load distribution mechanism extends from the rotation axis vertically downward and axially forward along the longitudinal axis to a lower contact surface.

2. The vehicle as set forth in claim 1 wherein the upper contact surface is vertically spaced from the rotation axis a first distance, and the lower contact surface is vertically spaced from the rotation axis a second distance.

3. The vehicle as set forth in claim 2 wherein the first distance is equal to the second distance.

4. The vehicle as set forth in claim 2 wherein the first distance is not equal to the second distance.

5. The vehicle as set forth in claim 1 wherein the upper contact surface and the lower contact surface engage the upper portion and the lower portion of the front fascia respectively, axially forward of the forward load bearing beam along the longitudinal axis, in response to the applied force.

6. The vehicle as set forth in claim 1 wherein the first portion and the second portion of the load distribution mechanism are flexible about the rotation axis, rearward along the longitudinal axis, to absorb energy in response to the externally applied force.

7. The vehicle as set forth in claim 1 further comprising a hinge interconnecting the forward load bearing beam and the load distribution mechanism, and defining the rotation axis.

8. The vehicle as set forth in claim 7 wherein the hinge includes a first hinge and a second hinge disposed on opposite sides of the longitudinal axis.

9. The vehicle as set forth in claim 8 wherein the lower portion of the load distribution mechanism includes a generally U-shaped configuration, and wherein the upper portion of the load distribution mechanism includes a generally inverted U-shaped configuration.

10. The vehicle as set forth in claim 1 wherein the rotation axis is perpendicular to the longitudinal axis.

11. A vehicle comprising:
    a support structure extending along a longitudinal axis between a forward end and a rearward end;
    a body attached to and supported by the support structure, and including a front fascia disposed transverse to the longitudinal axis and disposed adjacent the forward end of the support structure;
    a forward load bearing beam attached to the support structure and extending transverse to the longitudinal axis, generally parallel with the front fascia, and axially spaced rearward of the front fascia along the longitudinal axis; and
    a load distribution mechanism rotatably attached to the support structure for rotation about a rotation axis, and including a first portion for engaging an upper portion of the front fascia above the forward load bearing beam, and a second portion for engaging a lower portion of the front fascia below the forward load bearing beam;
    wherein the first portion of the load distribution mechanism extends from the rotation axis vertically upward and axially forward along the longitudinal axis to an upper contact surface;
    wherein the second portion of the load distribution mechanism extends from the rotation axis vertically downward and axially forward along the longitudinal axis to a lower contact surface; and
    wherein the front fascia engages the first portion and the second portion of the load distribution mechanism, and the load distribution mechanism rotates about the rotation axis to control displacement of the front fascia, in response to an externally applied force in which an object contacts the front fascia.

12. The vehicle as set forth in claim 11 wherein the upper contact surface is vertically spaced from the rotation axis a first distance, and the lower contact surface is vertically spaced from the rotation axis a second distance.

13. The vehicle as set forth in claim 12 wherein the first distance is equal to the second distance.

14. The vehicle as set forth in claim 12 wherein the first distance is not equal to the second distance.

15. The vehicle as set forth in claim 11 wherein the upper contact surface and the lower contact surface engage the upper portion and the lower portion of the front fascia respectively, axially forward of the forward load bearing beam along the longitudinal axis, in response to the applied force.

16. The vehicle as set forth in claim 11 wherein the first portion and the second portion of the load distribution mechanism are flexible about the rotation axis, rearward along the longitudinal axis, to absorb energy in response to the applied force.

17. The vehicle as set forth in claim 11 further comprising a hinge interconnecting the support structure and the load distribution mechanism, and defining the rotation axis.

* * * * *